(12) United States Patent
Verma et al.

(10) Patent No.: US 12,130,144 B2
(45) Date of Patent: Oct. 29, 2024

(54) DYNAMIC ROUTE RECOMMENDATION AND PROGRESS MONITORING FOR SERVICE PROVIDERS

(71) Applicant: Uber Technologies, Inc., San Francisco, CA (US)

(72) Inventors: Awaneesh Verma, San Francisco, CA (US); Ashley Quitoriano, San Francisco, CA (US); Dor Levi, San Francisco, CA (US); Emily Reinhold, San Franciscco, CA (US); Junjia He, San Francisco, CA (US); Rei Chiang, San Francisco, CA (US); Shicong Meng, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 256 days.

(21) Appl. No.: 17/674,650

(22) Filed: Feb. 17, 2022

(65) Prior Publication Data

US 2022/0170753 A1    Jun. 2, 2022

Related U.S. Application Data

(63) Continuation of application No. 16/188,585, filed on Nov. 13, 2018, now Pat. No. 11,300,416.
(Continued)

(51) Int. Cl.
*G01C 21/34* (2006.01)
*G01C 21/36* (2006.01)
(Continued)

(52) U.S. Cl.
CPC ..... *G01C 21/3415* (2013.01); *G01C 21/3453* (2013.01); *G01C 21/3492* (2013.01);
(Continued)

(58) Field of Classification Search
CPC ........ G01C 21/00; G01C 21/26; G01C 21/34; G01C 21/3407; G01C 21/3415;
(Continued)

(56) References Cited

U.S. PATENT DOCUMENTS

| 4,858,120 A | 8/1989 | Samuelson |
| 6,456,207 B1 | 9/2002 | Yen |

(Continued)

FOREIGN PATENT DOCUMENTS

| CN | 202443493 | 9/2002 |
| CN | 104021668 | 9/2014 |

(Continued)

OTHER PUBLICATIONS

Pan Juan; Proactive Vehicle re-routing strategies for congestion avoidance, 2017, NJIT.edu, https:// web.njit.edu/ borcea/ papers/ dcross 12.pdf (2017).

(Continued)

*Primary Examiner* — Charles J Han
(74) *Attorney, Agent, or Firm* — Mahamedi IP Law LLP

(57) ABSTRACT

A system can provide a set of expedition proposals that are each selectable by a service provider on a user interface of a computing device to commit the service provider to an expedition. Each expedition can be associated with a configured sequence of tasks to be performed for a given amount of time. Based on a selection of an expedition proposal from the set of expedition proposals, the system can initiate a corresponding expedition for the service provider by (i) matching the service provider with a sequence of tasks, and (ii) transmitting route data to the computing device to cause the user interface on the computing device to display route information for sequential destination locations for the sequence of tasks.

20 Claims, 6 Drawing Sheets

Related U.S. Application Data

(60) Provisional application No. 62/590,162, filed on Nov. 22, 2017.

(51) Int. Cl.
*G06Q 30/0283* (2023.01)
*G06Q 50/40* (2024.01)

(52) U.S. Cl.
CPC ..... *G01C 21/3626* (2013.01); *G06Q 30/0284* (2013.01); *G06Q 50/40* (2024.01)

(58) Field of Classification Search
CPC .............. G01C 21/3453; G01C 21/3492; G01C 21/36; G01C 21/3626; G06Q 30/00; G06Q 30/02; G06Q 30/0283; G06Q 30/0284; G06Q 50/00; G06Q 50/30

See application file for complete search history.

(56) References Cited

U.S. PATENT DOCUMENTS

| | | | |
|---|---|---|---|
| 6,516,056 | B1 | 2/2003 | Justice et al. |
| 9,147,198 | B2 | 9/2015 | Emans |
| 9,485,647 | B2 | 11/2016 | Mohebbi |
| 10,304,027 | B1* | 5/2019 | Haque ............ G06Q 50/40 |
| 10,359,783 | B2 | 7/2019 | Williams |
| 10,425,490 | B2 | 9/2019 | Yamashita |
| 10,697,784 | B1 | 6/2020 | Li |
| 11,122,255 | B2 | 9/2021 | Rahematpura |
| 11,482,111 | B2 | 10/2022 | Kuhn |
| 11,605,246 | B2 | 3/2023 | Brinig |
| 11,754,407 | B2 | 9/2023 | Pan |
| 2002/0034292 | A1 | 3/2002 | Tuoriniemi et al. |
| 2002/0194129 | A1 | 12/2002 | Furuya et al. |
| 2003/0187720 | A1 | 10/2003 | Takada |
| 2003/0195699 | A1 | 10/2003 | Jones |
| 2004/0106399 | A1 | 6/2004 | Ki |
| 2004/0219933 | A1 | 11/2004 | Faith |
| 2004/0260470 | A1 | 12/2004 | Rast |
| 2005/0234772 | A1 | 10/2005 | Haruki |
| 2005/0251333 | A1 | 11/2005 | Adamzyk |
| 2006/0059023 | A1 | 3/2006 | Mashinsky |
| 2006/0178812 | A1 | 8/2006 | Affleck |
| 2006/0217885 | A1 | 9/2006 | Crady et al. |
| 2008/0270204 | A1 | 10/2008 | Poykko |
| 2009/0192851 | A1 | 7/2009 | Bishop |
| 2009/0254270 | A1 | 10/2009 | Yu |
| 2010/0017275 | A1 | 1/2010 | Carlson |
| 2010/0036606 | A1 | 2/2010 | Jones |
| 2010/0325719 | A1 | 12/2010 | Etchegoyen |
| 2011/0099040 | A1 | 4/2011 | Felt |
| 2011/0153495 | A1 | 6/2011 | Dixon |
| 2011/0307282 | A1 | 12/2011 | Camp |
| 2012/0130627 | A1 | 5/2012 | Islam |
| 2012/0232943 | A1 | 9/2012 | Myr |
| 2013/0085819 | A1 | 4/2013 | Gore |
| 2013/0158846 | A1 | 6/2013 | Zhang |
| 2013/0226627 | A1 | 8/2013 | Kubovcik |
| 2013/0246207 | A1 | 9/2013 | Novak |
| 2014/0011522 | A1 | 1/2014 | Lin |
| 2014/0051465 | A1 | 2/2014 | Ruys |
| 2014/0229255 | A1 | 8/2014 | Scofield |
| 2015/0161563 | A1 | 6/2015 | Mehrabi |
| 2015/0206267 | A1 | 7/2015 | Khanna |
| 2015/0206437 | A1 | 7/2015 | Fowler |
| 2015/0262430 | A1 | 9/2015 | Farrelly |
| 2015/0271290 | A1 | 9/2015 | Tao |
| 2015/0324708 | A1 | 11/2015 | Skipp |
| 2015/0348221 | A1 | 12/2015 | Pedersen |
| 2015/0369621 | A1 | 12/2015 | Abhyanker |
| 2016/0055605 | A1 | 2/2016 | Kim |
| 2016/0129787 | A1 | 5/2016 | Netzer |
| 2016/0017515 | A1 | 6/2016 | Han |
| 2016/0209220 | A1 | 7/2016 | Laetz |
| 2016/0210691 | A9 | 7/2016 | LaFrance |
| 2016/0232719 | A1 | 8/2016 | Brinig |
| 2016/0247247 | A1* | 8/2016 | Scicluna ............ G06Q 50/40 |
| 2016/0307287 | A1 | 10/2016 | Jat |
| 2016/0307289 | A1 | 10/2016 | Choksi |
| 2016/0373473 | A1 | 12/2016 | Truong |
| 2017/0052034 | A1 | 2/2017 | Magazinik |
| 2017/0116566 | A1 | 4/2017 | Walton |
| 2017/0169366 | A1 | 6/2017 | Klein |
| 2017/0193458 | A1 | 7/2017 | Marco |
| 2017/0193625 | A1 | 7/2017 | Fan |
| 2017/0193826 | A1 | 7/2017 | Marueli |
| 2017/0227370 | A1 | 8/2017 | O'Mahony |
| 2017/0293925 | A1 | 10/2017 | Marueli |
| 2017/0314948 | A1 | 11/2017 | Racah |
| 2018/0025407 | A1 | 1/2018 | Zhang |
| 2018/0032928 | A1 | 2/2018 | Li |
| 2018/0032964 | A1 | 2/2018 | Gkiotsalitis |
| 2018/0060988 | A1 | 3/2018 | Klenk |
| 2018/0060990 | A1 | 3/2018 | Liu |
| 2018/0091604 | A1 | 3/2018 | Yamashita |
| 2018/0101877 | A1 | 4/2018 | Song |
| 2018/0102017 | A1 | 4/2018 | Brinig |
| 2018/0109922 | A1 | 4/2018 | Lin |
| 2018/0121847 | A1 | 5/2018 | Zhao |
| 2018/0137594 | A1 | 5/2018 | Marco |
| 2018/0143027 | A1 | 5/2018 | Schlesinger |
| 2018/0188049 | A1 | 7/2018 | Shi |
| 2018/0197071 | A1 | 7/2018 | Dong |
| 2018/0281803 | A1 | 10/2018 | Mukai |
| 2018/0302743 | A1 | 10/2018 | Bai |
| 2018/0322420 | A1 | 11/2018 | Marco |
| 2018/0332450 | A1 | 11/2018 | Chen |
| 2018/0336653 | A1 | 11/2018 | Levi |
| 2018/0339712 | A1 | 11/2018 | Kislovskiy |
| 2019/0146508 | A1 | 5/2019 | Dean |
| 2019/0146509 | A1 | 5/2019 | Dean |
| 2019/0154454 | A1 | 5/2019 | Verma |
| 2019/0156254 | A1 | 5/2019 | Hansen |
| 2019/0164432 | A1 | 5/2019 | Quitoriano |
| 2019/0212149 | A1 | 7/2019 | Ho |
| 2020/0005198 | A1 | 1/2020 | Nazerzadeh |
| 2020/0042019 | A1 | 2/2020 | Marczuk |
| 2020/0168100 | A1 | 5/2020 | Quitoriano |
| 2020/0192366 | A1 | 6/2020 | Levinson |
| 2020/0219220 | A1 | 7/2020 | Levi |
| 2020/0292346 | A1 | 9/2020 | Turner |
| 2020/0356911 | A1 | 11/2020 | Sahin |
| 2020/0393256 | A1 | 12/2020 | Sahin |
| 2020/0402392 | A1 | 12/2020 | Robinson |
| 2021/0020047 | A1 | 1/2021 | Kuhn |
| 2021/0065555 | A1 | 3/2021 | Kuncl |
| 2021/0108931 | A1 | 4/2021 | Liu |
| 2021/0295707 | A1 | 9/2021 | Quitoriano |
| 2021/0319380 | A1 | 10/2021 | Camp |
| 2022/0355834 | A1 | 10/2022 | Kuhn |
| 2023/0005363 | A1 | 1/2023 | Knoepfle |
| 2023/0114253 | A1 | 4/2023 | Quitoriano |
| 2023/0215276 | A1 | 7/2023 | Kuncl |
| 2023/0267565 | A1 | 8/2023 | Levi |
| 2023/0351274 | A1 | 11/2023 | Henrickson |
| 2023/0358552 | A1 | 11/2023 | Nickels |

FOREIGN PATENT DOCUMENTS

| | | |
|---|---|---|
| CN | 104537831 | 4/2015 |
| CN | 103136933 | 7/2015 |
| CN | 10585148 | 12/2015 |
| CN | 105679076 | 6/2016 |
| CN | 106127329 | 11/2016 |
| CN | 106408099 | 2/2017 |
| CN | 106529703 | 3/2017 |
| CN | 107451690 | 12/2017 |
| CN | 109034566 | 12/2018 |
| CN | 109493588 | 3/2019 |
| EP | 3355028 | 8/2018 |
| KR | 10-2019-007627 | 7/2019 |
| WO | WO 2012/0167319 | 12/2012 |

(56) References Cited

FOREIGN PATENT DOCUMENTS

| WO | WO 2016/0127109 | 8/2016 |
|---|---|---|
| WO | WO 2017/0132447 | 8/2017 |

OTHER PUBLICATIONS

Luo, Shuyu: Optimization: Loss Function under the Hood (Part I), Sep. 24, 2018, Towards Data Science (2018).

Luo, Shuyu: Loss Function (Part II): Logistic Regression, Oct. 13, 2018, Medium.com (2018).

Luo, Shuyu, Loss Function (Part III) Support Vector Machine, Oct. 15, 2018, Medium.com (2018).

ISR and Written Opinion in PCT/US2018/062084 dated Feb. 22, 2019.

ISR and Written Opinion in PCT/US2018/062297 dated Feb. 13, 2019.

IPRP in PCT/2018/062084 dated Jun. 4, 2020.

IPRP in PCT/2018/062297 dated Jun. 11, 2020.

ISR and Written Opinion in PCT/US2020/037604 dated Sep. 24, 2020.

ISR and Written Opinion in PCT/US2020/037562 dated Sep. 24, 2020.

Liang, Rerouting Buses using Data Science—Part 1, Open Government Products, Jan. 15, 2019, https://blog.data.gov.sg/ rerouting-buses-using-data-science-part-i-4d6c9d4f1f.

ISR and Written Opinion in PCT/US2020/032041 dated Oct. 1, 2020.

WRO in PCT/US2020/032041 dated Apr. 26, 2021.

Yuan, J. Where to find my next passenger Proceedings of the 13th International Conference on Ubiquitous Computing—UbiCom '11 (2011).

IPRP in PCT/US2020/032041 dated Jul. 29, 2021.

Mukai, Dynamic Location Management for On-Demand Car Sharing System, 2005, In: Khosia R., Howlett R.J., Jain L.C. (eds) Knowledge-Based Intelligent Information and Engineering Systems, KES 2005. Lecture Notes in Computer Science, vol. 3681. Springer, Berlin, Heidelberg, pp. 768-744 (2005).

Seow, K.T., "A collaborative multiagent taxi-dispatch system" IEEE Transactions on Automation science and engineering 7(3), 607-617, 2009.

Lalos, A Framework for Dynamic Car and Taxi Pools with the Use of Positioning Systems, 2009 Computation World: Future Computing, Service Computation, Cognitive, Adaptive, Content, Patterns, Nov. 15-20, 2009 (Year 2009).

\* cited by examiner

DYNAMIC ROUTE RECOMMENDATION AND PROGRESS MONITORING FOR SERVICE PROVIDERS

CROSS REFERENCE TO RELATED APPLICATION

This application is a continuation of U.S. patent application Ser. No. 16/188,585, filed on Nov. 18, 2018; which claims the benefit of priority to U.S. Provisional Application No. 62/590,162, filed on Nov. 22, 2017; the aforementioned applications being hereby incorporated by reference in their entireties.

BACKGROUND

Current navigation systems or services typically provide navigation instructions or turn-by-turn directions to users based on a selected destination location. Such navigation instructions may also be given to optimize for shortest time or shortest distance of travel.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1:
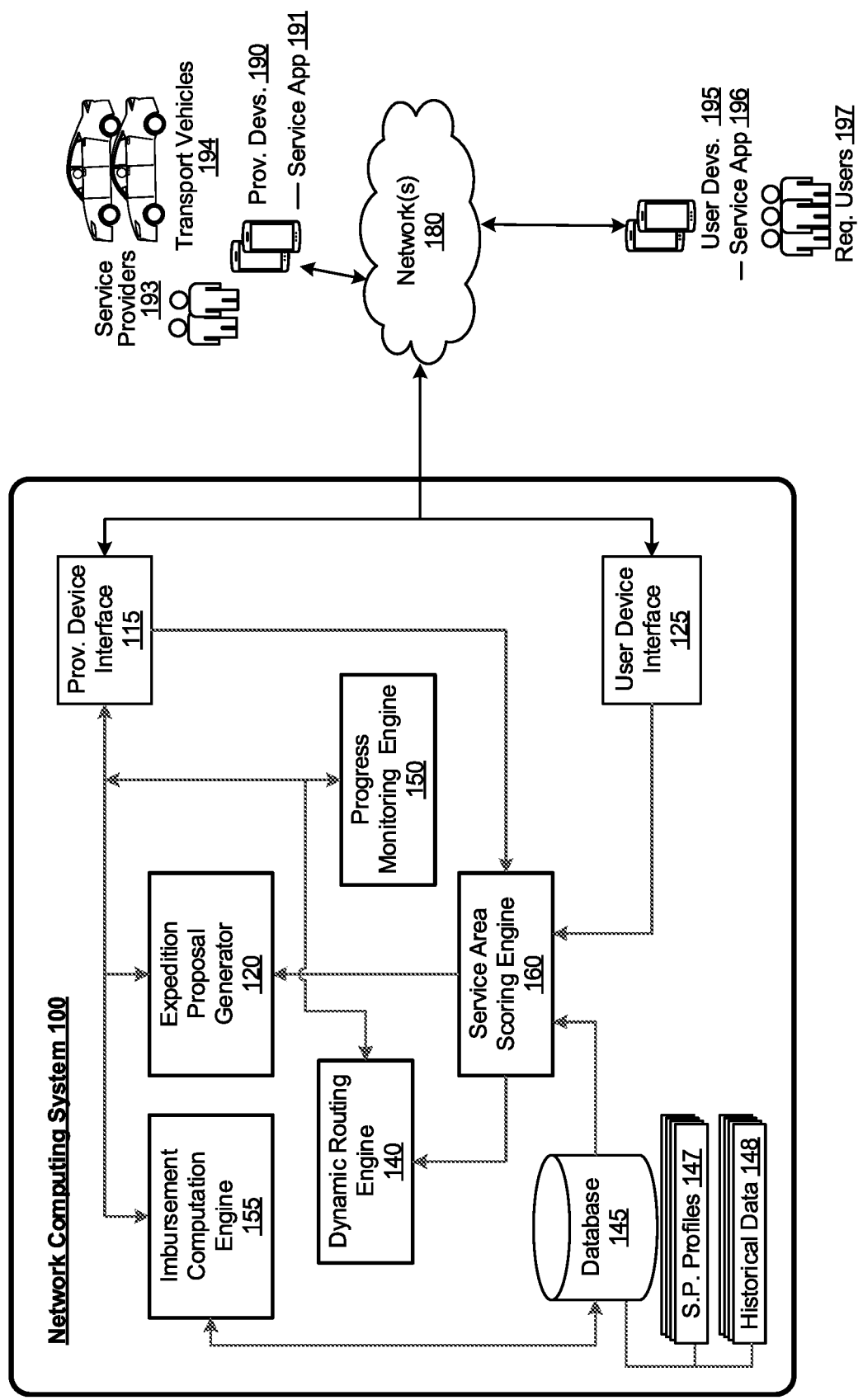
FIG. 1 is a block diagram illustrating an example network computing system in communication with user and transport provider computing devices, in accordance with examples described herein.

On-demand transport services (e.g., passenger transport or delivery services) can be managed by a network-based computing system by connecting requesting users with transport service providers (e.g., drivers) that utilize a designated transport service application. The designated application can execute on a computing device of the service provider to receive, from the network computing system, invitations to provide transport services for requesting users. A corresponding service application can execute on a computing device of the requesting user to enable the user to configure and transmit transport requests to the network computing system. The network computing system can receive location data from the computing devices of the requesting users and service providers to coordinate the transport services throughout the transport service region (e.g., an urban metroplex or bounded geographic region). For example, the network computing system can match requesting users with proximate service providers based on estimated time of arrival, distance, map data, and/or other more intricate matching models.

According to various examples, the network computing system can partition the transport service region into a plurality of sub-regions or areas (e.g., based on population, number of users, surface area, etc.). The network computing system can further collect and store historical supply/demand data for the transport service for each of the partitioned areas. The network computing system can also monitor real-time supply/demand data for each of the partitioned areas. Based on the historical and/or real-time data, the partitioned areas can be scored and/or ranked, or otherwise classified as oversupplied or undersupplied with regards to available service providers. For example, progressively lower scoring service areas may indicate undersupply, and the network computing system can initiate certain mitigating measures to more evenly distribute transport supply (e.g., service providers that can provide transport services) throughout the transport service region. In certain variations, the score of a partitioned service area may also be based on current traffic conditions within the service area and/or the surrounding service areas.

In accordance with various implementations, the scored service areas can enable the network computing system to construct and update a supply distribution model for the entire transport service region. The supply distribution model can comprise a set of trajectories for service providers to generally distribute them from oversupplied service areas to undersupplied service areas. In executing the supply distribution model, the network computing system can coordinate or implicitly encourage individual service providers through the use of, among other means, configured expedition proposals as described herein.

In some aspects, the network computing system can store historical earnings data throughout the transport service region (e.g., for each partitioned service area). The earnings data can be compiled from the earnings of individual trips serviced by the service providers. In certain examples, each individual trip can comprise a fare rate (e.g., either a standardized fare rate or variable rate based on supply demand constraints). The earnings data may be parsed by service area or more granularly (e.g., based on routes traveled, or based on pick-up and drop-off locations). According to various implementations, the network computing system can analyze the historical earnings data to predict future earnings for a given service area, over a certain amount of time. In certain variations, the historical earnings data may be analyzed to provide upfront pricing to requesting users, which can comprise a guaranteed upfront price for the requesting user given a known start location and a known destination. In examples described herein, the historical earnings data can further be utilized by the network computing system to provide upfront, guaranteed imbursements to the service provider for committing to a "dynamic expedition" configured by the network computing system.

In certain implementations, the network computing system can also collect driver data and store the data in a driver profile that indicates various attributes of an individual service provider. These attributes can include the driving characteristic or traits of the service provider (e.g., a propensity to drive quickly, slowly, and/or miss turns or exits, promptness in responding to transport invitations, adherence or compliance with recommended routes, an acceptance or cancelation rate for transport invitations, and the like), a service provider rating provided by passengers of the service provider, preferred driving areas, a home location, etc. Based on the individual attributes of the service provider, the network computing system can individually tailor "expedition proposals" for the service provider. For example, each expedition proposal can be presented on the service provider's computing device as a selectable feature that, when selectable, commits the service provider to a dynamic expedition, performing transport tasks (e.g., providing transport services by making stops for pick-ups and/or drop-offs) along a dynamically determined route based, at least in part, on the supply distribution models (e.g., supply trajectories as determined by the collective supply/demand scores of the partitioned service areas). Additionally or alternatively, the network computing system can also generate a set of generalized expedition proposals selectable by any service provider within a certain proximity of a start location or start area.

A current problem in the field of on-demand transport is uncertainty for individual service providers when they decide to become available for service (e.g., go online or start a service session). Little or no guarantees are provided to service providers concerning the number of transport invitations received or projected earnings for a given service session. Another technical problem in the field of on-demand transport is the uneven distribution of computing devices of service providers as compared to the computing devices of requesting users throughout a transport service region, resulting in local pockets of service provider oversupply and undersupply conditions, sometimes quite severely. It is contemplated that the coordination of device migration through explicit means (e.g., providing direct notifications to service provider computing devices of undersupplied service areas) or implicit means (e.g., providing service providers with astutely configured expedition proposals described herein) can achieve an effect of smoothing the supply conditions over an entire region by facilitating service provider computing device migration. In some aspects, the utilization of expedition proposals can comprise a gamified experience that both enhances service provider experience and provides service providers with compensation certainty for any given service session.

As used herein, an "expedition proposal" comprises a selectable feature displayed on a service provider's computing device (e.g., on a user interface of the designated transport application executing on the service provider's computing device) that, when selected, commits the service provider to a dynamic transport expedition configured and coordinated by the network computing system in real-time. Each expedition proposal can be configured for the individual service provider based on current and/or forecasted supply/demand conditions of the partitioned service areas, and/or historical supply/demand data for the partitioned service areas, as well as based on contextual data about the individual service provider (e.g., the service provider's behavior, current location, start and/or end locations of the session, number of hours the service provider wishes to be available for service). In various implementations, each expedition proposal can also include a guaranteed imbursement total or rate for providing transport services for a set amount of time or in accordance with a configured schedule (e.g., to factor in break time for the service provider). In still further implementation, the expedition proposal may be configured to be individually tailored to the service provider (e.g., to stay within preferred areas, increased imbursement guarantee for highly rated or more prompt service providers, etc.). The network computing system can configure multiple expedition proposals for display on the service provider's computing device. According to some examples, the expedition proposal(s) for an individual service provider can be generated and displayed on the user interface of the transport application in response to detecting that the service provider launched the transport application, logged on, or has indicated availability to provide transport services (e.g., went on-duty or started a transport session).

In various examples, when a service provider selects an expedition proposal, the service provider is committed to provide transport services (e.g., fulfill a sequence of transport requests from requesting users) along recommended or mandated routes configured dynamically by the network computing system based on real-time and/or forecasted supply/demand data for the partitioned service areas and received transport requests. The routes and turn-by-turn directions can be determined dynamically by the network computing system based on a dynamic transport trajectory—centered on or based on the service provider's current location—that is based on the scored service areas proximate to the service provider. In variations, the scored service areas may be clustered into recommendation zones, and the dynamic transport trajectory can act to reposition or generally migrate service providers from oversupplied zones to undersupplied zones.

In some aspects, the network computing system can provide route data to the service provider's computer device that cause the computing device to display a turn-by-turn route map and/or directions that provides the service provider with mapping directions along the recommended route, and to sequential destination locations for the transport tasks (e.g., each respective pick-up and drop-off location of the dynamic expedition).

According to certain aspects, the network computing system can monitor the progress of a service provider over the course of a dynamic expedition based on a set of expedition progression constraints. These progression constraints can factor in deviations from the recommended routes, temporal attributes of the provider (e.g., the driver takes a long time to accept transport invitations, drives unusually slowly, ignores invitations and/or other notifications, etc.), acceptance traits (e.g., indicating whether the service provider generally accepts or cancels invitations), and the like. For example, the progression constraints can require a minimum average speed along the recommended route given current traffic conditions (e.g., to prevent the service provider from simply pulling over and waiting). Each violation of the progression constraints can comprise a demerit or decreased performance metric in the dynamic expedition. In some examples, when a service provider accepts an expedition proposal, the service provider's computing device is not presented with an option to accept or decline a particular transport invitation, but is placed into an expedition mode in which the service provider is automatically assigned to transport requests and obliged to fulfill each sequential transport task of the dynamic expedition.

During the dynamic expedition, the network computing system can provide the service provider with a recommended route based on the dynamic trajectory, and match the service provider with requesting users along the recommended route. In various aspects, the network computing system can match the service provider with a series of transport tasks along the recommended route, such as passenger transport requests (e.g., carpool or standard transport services), food delivery requests, freight or package delivery requests, and the like. In some examples, the service provider can configure which transport services the service provider wishes to provide, or the available transport services for the service provider may be indicated in the stored service provider profile.

In certain implementations, if the service provider has received more than a threshold amount of demerits based on the set of progression constraints, then the dynamic expedition may be terminated for the service provider (e.g., the driving session and/or transport application can be placed in or operate under a different mode, such as a default service mode). In certain aspects, this termination can result in the loss of the guaranteed imbursement. However, to compensate the service provider for providing transport services, the network computing system can also determine a sum total of normal individual fares completed by the service provider, and deposit this sum total into an account of the service provider. Accordingly, over the course of the dynamic expedition, the network computing system can also track normal earnings based on a normal fare rate for providing the transport services.

Conversely, at an expiration time of the dynamic expedition, the network computing system can compensate the service provider with the guaranteed imbursement (e.g., by depositing the imbursement into an account of the service provider). In certain variations, the network computing system can first determine whether the guaranteed imbursement is greater than or less than a sum total of normal individual fares completed over the course of the dynamic expedition. If so, then the guaranteed imbursement may be deposited into the service provider's account. However, if not, then the network computing system can deposit the sum total into the service provider's account.

In further implementations, the network computing system can provide the computing device of the service provider with an expedition configuration interface that enables the service provider to customize a dynamic expedition. The configuration interface can include input features that enable the service provider to input a desired session time or schedule (e.g., the number of hours to be driven plus break times). The input features can further include preferred driving areas, available service types (e.g., carpool, luxury vehicle transport, standard vehicle transport, large capacity vehicle transport, food delivery, freight or package delivery, and the like), a desired start location, and/or a desired end location.

In some embodiments, the configuration interface can comprise a set of queries that the network computing system can utilize to configure the customized dynamic expedition. Once input fields have been configured, the network computing system can process the configurations based on current and historical supply/demand data, forecasted supply/demand data, and/or historical earnings data in order to output a guaranteed imbursement for the customized dynamic expedition. For example, the guaranteed imbursement may be based on (i) the set of configurations inputted by the service provider, (ii) a current location of the service provider, and/or (iii) a set of supply/demand forecasts for the on-demand transport service in the transport service region. In certain implementations, the customized dynamic expedition can be displayed as a proposal within a set of expedition proposals to enable the service provider to compare and contrast the guaranteed imbursements for each expedition proposal prior to selection.

As used herein, a computing device refers to devices corresponding to desktop computers, cellular devices or smartphones, personal digital assistants (PDAs), laptop computers, virtual reality (VR) or augmented reality (AR) headsets, tablet devices, television (IP Television), etc., that can provide network connectivity and processing resources for communicating with the system over a network. A computing device can also correspond to custom hardware, in-vehicle devices, or on-board computers, etc. The computing device can also operate a designated application configured to communicate with the network service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, VR or AR devices, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In particular, the numerous machines shown with examples of the invention include processors and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Description

FIG. 1 is a block diagram illustrating an example network computing system in communication with user and service provider devices (e.g., service provider computing devices), in accordance with examples described herein. In various examples described herein, the network computing system 100 can include an imbursement computation engine 155, an expedition proposal generator 120, a dynamic routing engine 140, a progress monitoring engine 150, and a service area scoring engine 160. The network computing system 100 can further include a database 145 that stores service provider profiles 147 and historical data 148 as described herein (e.g., historical supply/demand data and historical earnings data). The network computing system 100 can further include a user device interface 125 to communicate with user devices 195 of requesting users 197 over one or more networks 180 (e.g., via an executing service application 196). The network computing system 100 can further include a service provider device interface 115 that communicates with service provider computing devices 190 of service providers 193 (e.g., service providers) over the network(s) 180 (e.g., via an executing a service application 191). The service providers 193 can each operate a transport vehicle 194 accordingly to provide on-demand transport services coordinated by the network computing system 100.

According to various examples, the service providers 193 can each utilize a device 190 (e.g., a mobile computing device) to execute a service application 191 that links the service provider device 190 with the service provider device interface 115 of the network computing system 100. The service provider device interface 115 can access location data, indicating the dynamic location of the service provider 193, from a location-based resource (e.g., a GPS module) of the service provider device 190 via the executing service application 191. In addition to receiving the service provider's location, the service provider device interface 115 can transmit transport invitations to the service providers 193 via the service application 191 to enable the service providers 193 to service requests (e.g., requests for transportation, delivery, etc.) made by requesting users 197 of the on-demand services coordinated and managed by the network computing system 100.

For example, the requesting users 197 can execute a service application 196 on their user devices 195 (e.g., mobile computing devices) to configure and transmit a pick-up request, a food delivery request, a package or mail delivery request, and the like. The requesting users 197 can transmit the requests to the user device interface 125 of the network computing system 100 over the one or more networks 180. In various implementations, the requesting users 197 can make such on-demand service requests for any pick-up location and destination within the service region.

When the service providers 193 accept a service invitation, the network computing system 100 can log an on-trip status for the service provider 193 (e.g., in a service provider profile 147 for the service provider 193 stored in a database 145). Accordingly, service providers 193 throughout the service region can be classified by the network computing system 100 as either unavailable, available or on-duty, and on-trip. In various examples described herein, the service area scoring engine 160 can logically parse the service region into several service areas, and rank or score each service area based on supply/demand conditions. For example, on a scale from one to ten, a respective service area having a slight oversupply condition (e.g., having more available service providers 193 than requesting users 197) can be scored as a four, whereas a severe oversupply condition can be scored as a one or two. Along these lines, a slightly undersupplied service area can be scored as a six, whereas a severely undersupplied service area may be scored as a nine or ten.

In scoring each service area, the scoring engine 160 can monitor the requesting users 197 (e.g., users that have submitted a service request) versus service providers 193 having an available status within the service area. In certain aspects, when a service area has the same or similar number of available service providers as requesting users, or submitted service requests, at any given time, the service area can be classified as being in equilibrium. It is contemplated that an equilibrium condition is ideal for the entire service region, such that any service demand condition within any service area can be readily met with an equal service provider supply condition.

Certain strategies utilized by examples described herein involve the coordination of service providers 193 in such a manner that service provider supply tends to move or migrate from oversupplied service areas to undersupplied service areas. Such strategies can involve real-time notifications to the service providers 193 of the supply/demand conditions, or as described herein, actively routing the service providers 193 along sequences of transport tasks that, collectively throughout the entire region, acts as an equalizing force to any current supply/demand condition within any particular service area of the transport service region. In accordance with example implementations, the general pattern of supply migration can be coordinate based on a dynamically constructed supply distribution model that itself can be based on the collection of supply/demand scores of service areas that comprise the transport service region.

According to various examples, the respective sequences of transport tasks can be coordinated dynamically by the network computing system 100 across every service area of the transport service region, and for any number of service providers 193 and requesting users 197 (e.g., on the order of thousands for a transport service region at any given time). As provided herein, a "transport service region" can comprise any region in which transport service demand exists (e.g., an urban metroplex, such as the greater Pittsburgh, Pa. metropolitan area). Such transport service regions can comprise land-based, aquatic, and/or air-based transport services, including passenger transport, cargo delivery, mail delivery, comestible goods delivery, and the like. The boundaries of a transport service region need not be confined by any particular border—such as county lines, state borders, or international borders—but rather can be logically defined in terms of demand for transport services.

A "service area" is defined herein as a fractional portion of the transport service area, and can divide the transport service area based on substantially equal surface area or a substantially equal user and/or service provider base. For example, a transport service area including the Dallas/Fort Worth metroplex, totaling nearly nine thousand square miles, can be parsed into ninety-six polygonal service areas in which the service area scoring engine 160 individually monitors supply/demand conditions in real time. The service area polygons may encompass nearly equal surface area, or may be sized based on population within each service area. Accordingly, the scoring engine 160 can attribute a supply-demand score to each service area dynamically based on transport requests received from requesting users 197 and available service providers 193.

According to various implementations, the expedition proposal generator 120 can customize expedition proposals for individual service provider 193 based on a variety of factors, such as the service provider's current location and supply/demand scores of proximate service areas in relation to the service provider 193. Additionally or alternatively, the expedition proposal generator 120 can dynamically monitor the supply/demand scores of the transport service region and generate a connecting set of optimal trajectories for service provider supply that can effectively equalize the supply/demand conditions—or otherwise tend to evenly distribute service provider supply based on transport demand—throughout the entirety of the transport service region at any given time.

Based at least in part on the connecting set of optimal trajectories, the expedition proposal generator 120 can determine a set of expeditions from selected start locations that would effectively move service provider supply from low scoring (or oversupplied) service areas to higher scoring (or undersupplied) service areas. In doing so, the expedition proposal generator 120 can determine a set of routes through the road network of the transport service region, starting from the determined start location, which can comprise a dynamic expedition for a service provider 193. Over the course of the set of routes, the network computing system 100 can match the service provider 193 with requesting users 197 along the route set corresponding to the expedition, and transmit transport task updates to the service provider 193 accordingly.

In various examples, the set of routes and matched transport tasks comprising the expedition can be dynamically determined as the service provider 193 embarks on and proceeds through the expedition, based on the real-time service area scores. Accordingly, for any given start location (e.g., located within an oversupplied service area), the accepted expedition may be dynamically determined in nature, such that the entire expedition is not known from the outset of the expedition. For example, at any given time, the dynamic routing engine 140 can match the service provider 193 with one or more upcoming transport tasks, having a pick-up location and a destination, that will move the service provider 193 across service areas based on the dynamically determined trajectories, which themselves can be based on the dynamic scores of the service areas.

In variations, the expedition proposal generator 120 can generate a set of static or dynamic expeditions based on the current supply/demand scores and historical supply/demand data 148 collected for the transport service region, and stored in the database 145. The historical data 148 can indicate historical supply/demand scores for the transport service region at given times of day, days of the week, and traffic or event conditions (e.g., when a schedule mass egress event occurs locally, such as a sporting event). Accordingly, in addition to monitoring current supply/demand conditions, the service area scoring engine 160 can further forecast supply/demand scores based on the historical data 148, current traffic conditions, expected mass egress events, and the like.

In accordance with many examples, the service area scoring engine 160 can generate a dynamic score for each service area based on current supply/demand conditions, as well as one or more forecasted supply demand scores based on the historical data 148 for each service area (e.g., a forecasted score for five or ten minutes into the future, and a forecasted score for an hour into the future). The expedition proposal generator 120 can generate static or dynamic expedition proposals based on the current and forecasted service areas scores.

A generated expedition proposal can comprise a selectable feature on user interface of the service application 191 generated on the service provider device 190 that can include a start location, a commitment time or schedule for providing transport services, and an upfront imbursement compensation offer for completing an expedition. It is contemplated that certain concepts of gamification can provide service providers 193 with elements that contribute to a more positive experience for the service provider 193, in addition to the freedoms inherent in self-establishing on-line or available status for providing services. In examples described, the elements of earnings uncertainty and placement uncertainty for individual service providers 193 can be mitigated or eliminated, resulting in a significantly enhanced driver experience.

The imbursement computation engine 155 can output an upfront earnings amount for the completion of a dynamic expedition. In various examples, the historical data 148 can further include historical earnings data for the transport service region that can enable the imbursement computation engine 155 to calculate an imbursement offer for each determined expedition proposal by the expedition proposal generator 120. Traditionally, earnings have been calculated based on individual fare rates based on distance and/or time traveled. This antiquated approach to calculating fares can create opportunity for service providers to "pump" a fare, consciously or unconsciously, by traveling longer distances unnecessarily and/or taking a longer time to make the drop-off.

Acceptance of an expedition proposal can mitigate or eliminate this undesirable opportunity by providing the service provider 193 with a guaranteed, upfront imbursement offer for completing the dynamic expedition. In various examples, the imbursement computation engine 155 calculate the guaranteed imbursement offer for a dynamic expedition based on the forecasted supply/demand scores for service areas through which the dynamic expedition is expected to traverse. Accordingly, the imbursement computation engine 155 can forecast expected earnings of the service provider 193 for completing a set of future transport tasks on the dynamic expedition for the committed amount of time.

According to certain aspects, the guaranteed imbursement computation can correlate directly to the forecasted earnings for the service provider 193. In certain aspects, the forecasted earnings can be individually tailored based on the historical driving characteristics of the service provider 193. For example, the service provider profile 147 of the service provider 193 can comprise an efficiency and/or reliability score based on how efficient the service provider 193 is in providing transport services given traffic conditions and/or supply/demand conditions, how reliable the service provider 193 is accepting or canceling transport invitations, and the like. The service provider profile 147 can further store driving characteristics (e.g., classifying the service provider based on their average driving speed over time), a service provider rating as determined by previously serviced passengers, location or service area preferences, a traffic law compliance metric (e.g., indicating any traffic law violations or any propensity towards traffic law compliance or noncompliance), and the like.

Accordingly, if the service provider 193 is relatively efficient and reliable, the imbursement computation engine 155 can forecast relationally increased expected earnings for the service provider 193 based on the antiquated individual fare calculations. Thus, the guaranteed imbursement displayed with a particular expedition can fluctuate depending on the reliability and efficiency of a service provider 193.

Upon selection of a displayed expedition proposal on the service provider device 190, the service provider 193 may be handed off to the dynamic routing engine 140, which can match the service provider 193 to sequential transport tasks requested by the requesting users 197. In certain aspects, the dynamic routing engine 140 can receive the service provider's current location, and real-time service area scores from the scoring engine 160 to determine an optimal trajectory for the service provider 193. As described herein, the optimal trajectory can comprise a vector (including a magnitude and a direction) centered on the service provider's current location and based on the supply/demand scores of current and proximate service areas in relation to the service provider 193. In certain examples, the magnitude of the vector can correspond to differences in supply/demand scores in surrounding service areas. For example, a large discrepancy between the respective supply/demand scores of a current service area and one or more adjacent service areas can result in a longer trajectory vector.

It is contemplated that the optimal trajectory will not typically align with the streets of a road network on which the service provider 193 operates. Accordingly, the dynamic routing engine 140 can utilize the optimal trajectory as a baseline or primary factor in routing the service provider dynamically 193, whereas other factors, such as traffic conditions and estimated travel time can be factored into the dynamic routing as well. In certain aspects, the dynamic routing engine 140 can provide the service application 191 on the service provider device 190 with turn-by-turn directions, or lane-by-lane directions, of the optimal route to each sequential task location of the dynamic expedition (e.g., pick-up and drop-off locations).

As described herein, the directions provided by the dynamic routing engine 140 can comprise optimized routing directions both in terms of time and in terms of direction in light of the optimally determined trajectory. However, while on the dynamic expedition, the service provider 193 can still be free to diverge from the optimized route given an upcoming task location (e.g., a pick-up point). For example, a service provider 193 may be intimately familiar with a certain area and can take unmapped backroads and alleyways that may cut down on drive time.

In certain implementations, the dynamic routing engine 140 leverages the advantages of optimized routing using a set of optimization inputs, such as granular traffic data, ETA data, live traffic reports, historical traffic data, and the supply/demand scoring information provided by the service area scoring engine 160 to generate a dynamically optimized route for the service provider 193 while executing the expedition. Accordingly, the service provider 193 may be incentivized to follow the optimized route provided by the dynamic routing engine 140 such that, for example, the service provider 193 makes a drop-off on the optimal corner of an intersection to continue onwards and pick up a next requesting user 197. Furthermore, the series of optimizations of the network computing system 100 (e.g., the expedition proposals, the computed imbursements, and the dynamic routing) can operate in concert across the transport service region to achieve an efficient supply/demand equalization effect for the transport service region.

In various implementations, the network computing system 100 can include a progress monitoring engine 150 that receives the location data from the service provider devices 190 to dynamically determine whether the service provider 193 on a respective expedition follows the optimized route determined by the dynamic routing engine 140. In certain aspects, the progress monitoring engine 150 can gauge the progress of the service provider 193 against a set of expedition progression constraints. These constraints can comprise determining whether the service provider 193 deviates from the optimized route, a temporal consequence or ETA delay due to the deviation, expedition delays due to abnormally slow driving (e.g., based on the driving characteristics of the service provider), unscheduled or unexpected stops made by the service provider 193, pauses or cancelations of transport tasks during the expedition, violations of traffic laws (e.g., running stop signs or speeding) and the like.

In some aspects, the progress monitoring engine 150 can issue background demerits (e.g., unseen by the service provider) or demerit notifications to the service provider 193 when the service provider 193 contravenes the set of expedition constraints. Additionally or alternatively, when the service provider 193 contravenes or otherwise disregards the expedition (e.g., ignores the optimized route, cancels a transport task of the expedition, take unscheduled breaks, violates traffic laws, etc.) beyond a threshold level or exceeds a threshold number of demerits, the progress monitoring engine 150 can transmit a trigger notification to the service provider 193 that terminates the expedition. In such a scenario, instead of receiving the guaranteed imbursement correlated to the accepted expedition proposal, the imbursement computation engine 155 can deposit a sum total of fares that the service provider 193 has completed for the terminated expedition.

For example, over the course of the expedition, the imbursement computation engine 155 can calculate a fare for each transport task completed by the service provider in connection with the expedition. Upon termination of the expedition due to excess contraventions of the expedition progression constraints, the sum total of calculated fares may be provided to the service provider 193, as opposed to the guaranteed imbursement.

Conversely, if the service provider 193 completes the expedition and remains below the demerit threshold, the imbursement computation engine 155 can determine whether the sum total of fares for completing each individual transport task of the expedition is less than or greater than the guaranteed imbursement correlated to the accepted expedition proposal. If the sum total is less than the guaranteed imbursement, the imbursement computation engine 155 can compensate the service provider 193 with the greater guaranteed imbursement (e.g., by depositing the greater amount in an account of the service provider 193). However, if the sum total is greater than the guaranteed imbursement amount, then the imbursement computation engine 155 can compensate the service provider 193 with the great sum total as opposed to the lesser guaranteed imbursement.

As described herein, the imbursement computation engine 155 can individualize computations based on the service provider's reputation, efficiency, driving characteristics, and other factors (e.g., adherence to traffic laws). Accordingly, for each completed or uncompleted expedition by a service provider 193, the imbursement computation engine 155 can adjust a computation formulation individual to the service provider 193. For example, a service provider 193 that consistently completes expeditions and performs in a manner such that the sum total of individual fares consistently exceeds the guaranteed imbursements correlated to those expeditions, can receive increased values of guaranteed imbursements correlated to future expedition proposals for that service provider 193.

As such, the service provider 193 is not only incentivized to complete expeditions (e.g., resulting in compensation to the service provider 193 with the greater of two calculated amounts), the service provider 193 is also incentivized to perform exceptionally while executing expeditions. Along these lines, efficient service providers 193 can receive additional rewards whereas less economical service providers can be incentivized to improve, creating a more robust and efficient transport service for both the service providers 193 and the requesting users 197.

In addition to the examples described, the service application 191 on the service provider devices 190 can include an expedition customization feature that enables the service provider 193 to input a set of expedition configurations, such as a start time and end time for driving, a break schedule, a start and/or end location, service area constraints (e.g., avoiding dangerous areas), and the like. For example, the service provider 193 can set a drive time of three hours starting at 10:00 a.m. from the service provider's home, and with a half-hour break at 11:30 a.m. Based on these custom expedition configurations, the expedition proposal generator 120 can generate a customized expedition proposal for the service provider 193, and the imbursement computation engine 155 can calculate a guaranteed imbursement and couple it to the customized proposal.

In various examples, the customized expedition proposal can be generated to be displayed as a selectable feature on a display screen of the service provider device 190 along with a list of other expedition proposals for the service provider's consideration. Upon selection of any of the expedition proposals by the service provider 193, the expedition may begin immediately, or upon the service provider's arrival at a start location indicated on the expedition proposal. Once the expedition begins, the expedition may be coordinated by the dynamic routing engine 140 (e.g., based on the optimal trajectory as determined by the service area scoring engine 160). The dynamic routing engine 140 can receive transport requests from the user devices 195 of requesting users 197, and optimally match the requests to service providers 193 on respective expeditions. In addition, the expedition may be monitored by the progress monitoring engine 150, which can tally demerits based on a set of expedition progression constraints, as described herein. Still further, over the course of the expedition, the imbursement computation engine 155 can track the sum total of individual fares for completed transport tasks of the expedition. Upon completion of the expedition, the imbursement computation engine 155 can compensate the service provider 193 in accordance with the examples described herein.

Computing Device

Figure 2:
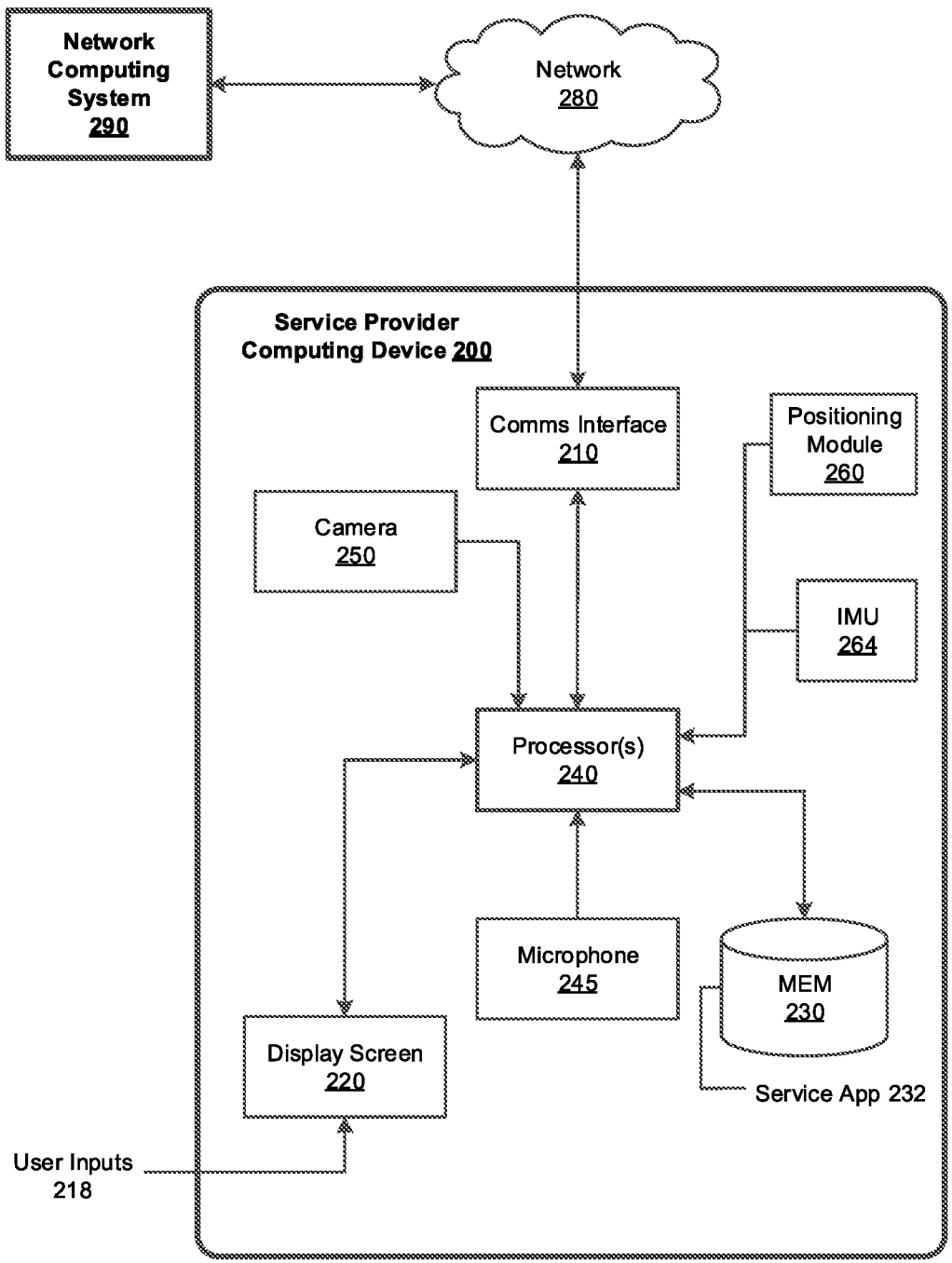
FIG. 2 is a block diagram illustrating an example computing device executing and operating a designated transport application for communicating with a network transport service, according to examples described herein.

FIG. 2 is a block diagram illustrating an example service provider computing device 200 executing and operating a designated service application 232 for communicating with a network service, according to examples described herein. In many implementations, the service provider computing device 200 can comprise a mobile computing device, such as a smartphone, tablet computer, laptop computer, VR or AR headset device, and the like. In certain implementations, the service provider computing device 200 can comprise an integrated computer of a service provider's vehicle, and can include a display on a dashboard or center console. Further, the service provider computing device 200 can include typical telephony features such as a microphone 245, a camera 250, and a communication interface 210 to communicate with external entities using any number of wireless communication protocols. The computing device 200 can further include a positioning module 260 and an inertial measurement unit 264 that includes one or more accelerometers, gyroscopes, or magnetometers. In certain aspects, the service provider computing device 200 can store a designated service application 232 in a local memory 230. In variations, the memory 230 can store additional applications executable by one or more processors 240 of the service provider computing device 200, enabling access and interaction with one or more host servers over one or more networks 280.

In response to a user input 218 by the service provider (e.g., the selection of an icon representing the transport service application 232), the transport service app 232 can be executed by a processor 240, which can cause an app interface to be generated on a display screen 220 of the service provider computing device 200. As provided herein, the service application 232 can further enable a communication link with a network computing system 290 over the network 280, such as the computer system 100 as shown and described with respect to FIG. 1. The processor 240 can generate user interface features (e.g., map, service provider status, expedition proposals, dynamic routing information, etc.) using content data received from the network computing system 290 over network 280. Furthermore, as discussed herein, the transport service application 232 can enable the network system 290 to cause the generated user interface to be displayed on the display screen 220 to include a set of expedition proposals, as described herein.

In various examples, the positioning module 260 can provide location data indicating the current location of the service provider to the network computing system 290 to, for example, enable the network computing system to coordinate each dynamic expedition corresponding to the set of expedition proposals. In certain aspects, the service provider's selection of an expedition proposal can trigger the network computing system 290 to transmit turn-by-turn route data comprising route directions to the computing device 200. The turn-by-turn directions may be displayed on the display screen 220 to enable the service provider to complete each respective transport task of the dynamic expedition.

For example, the network computing system 290 can dynamically determine a sequence of transport tasks for the service provider in accordance with the service area scores and optimal trajectory centered on the service provider. Transport request locations that substantially align with the optimal trajectory may be matched with the service provider, and turn-by-turn route data can be transmitted to the computing device 200 to provide the service provider with turn-by-turn directions to a next transport task location (e.g., a passenger pick-up location). Accordingly, when the service provider completes a transport service task, the network computing system 290 can have another transport service matched to the service provider, and thus transmit a new set of turn-by-turn route data to the computing device 200 to enable the service provider to complete the next sequential transport service task. This process can repeat until the service provider schedules a break or until the expedition is completed.

Methodology

Figure 4:
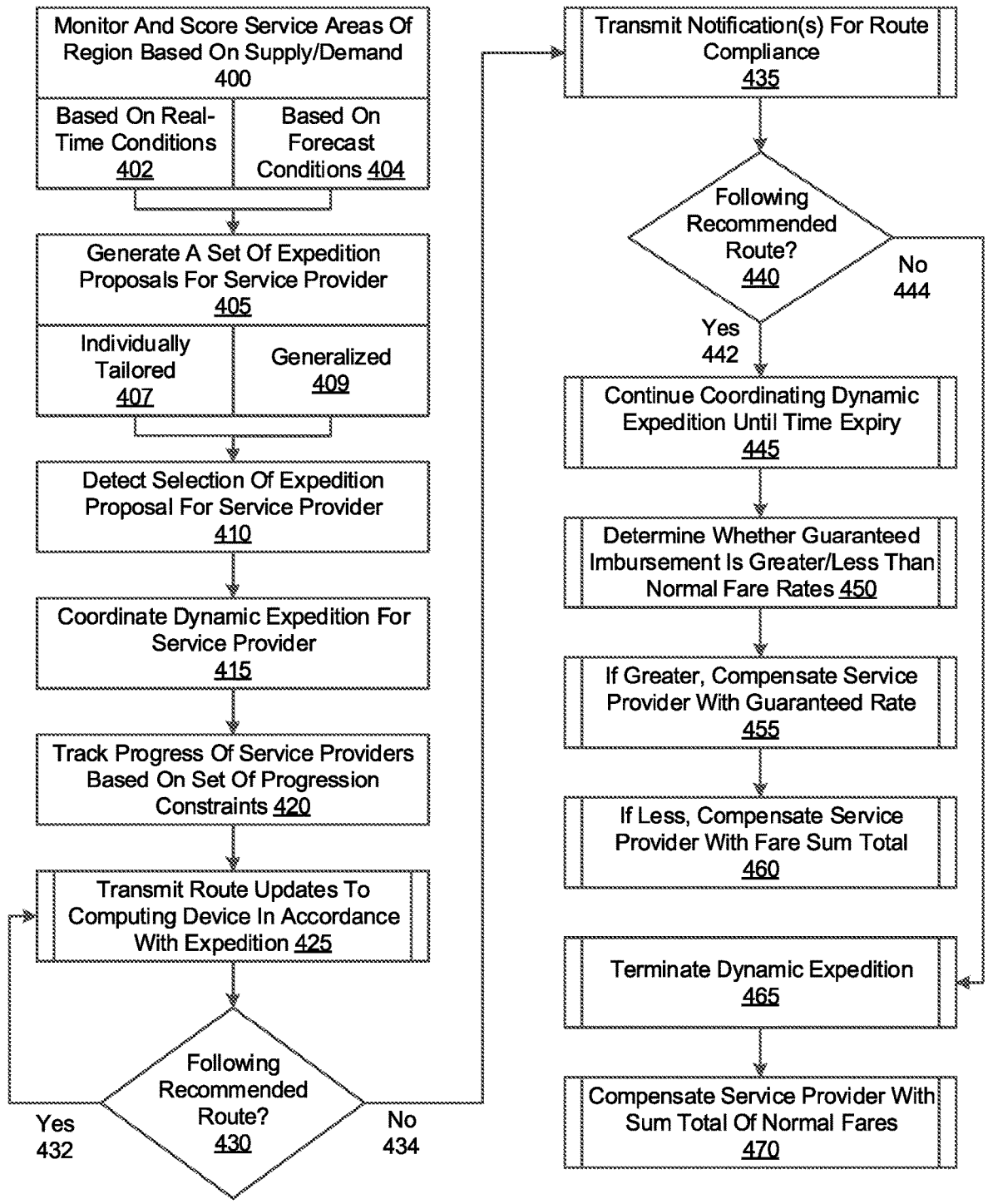
FIG. 4 is a flow chart describing an example method of progress monitoring for a transport provider committed to a dynamic expedition, according to examples described herein.
Figure 5:
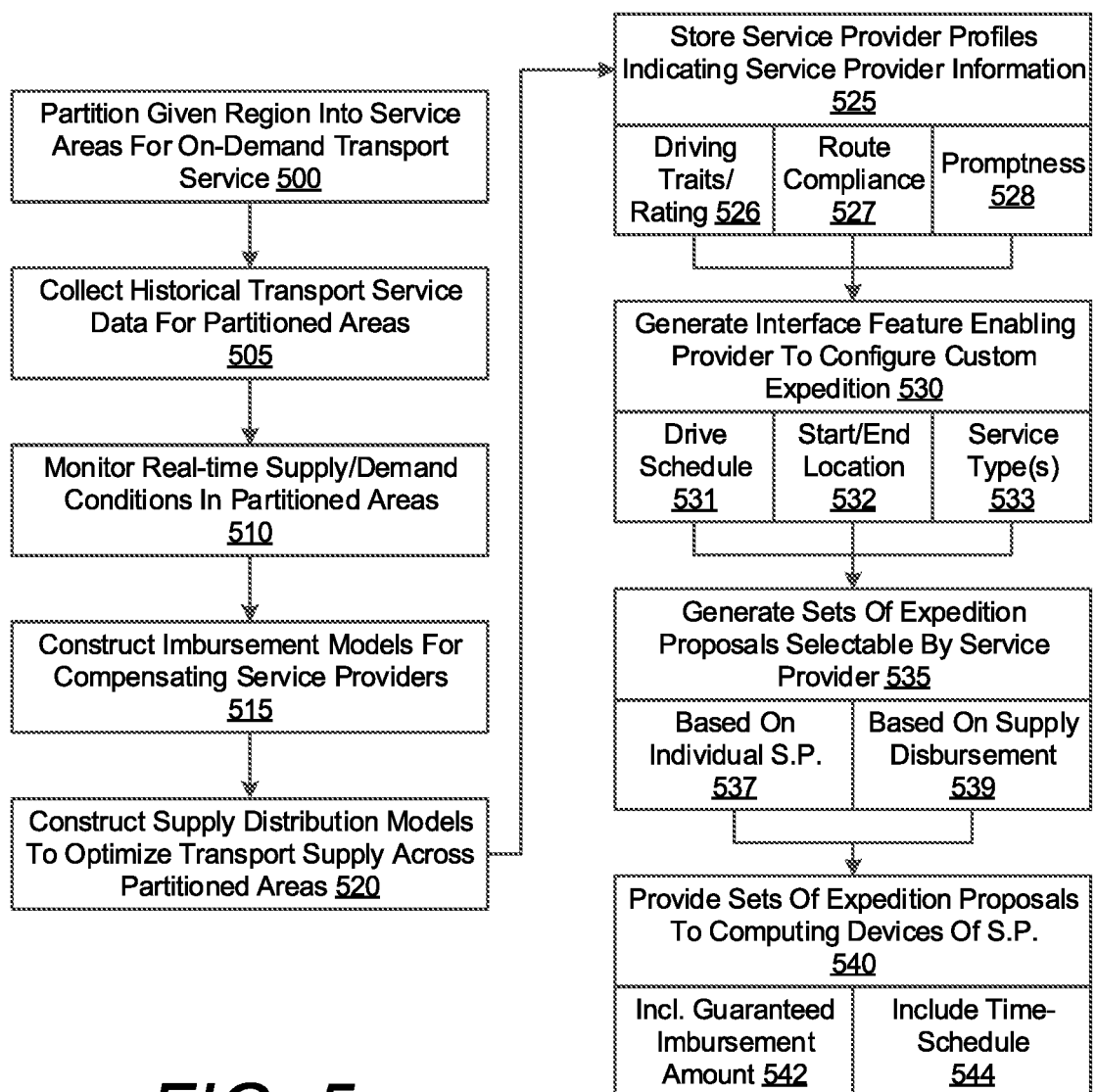
FIG. 5 is a flow chart describing an example method of monitoring supply/demand conditions for partitioned areas and executing optimal transport supply disbursement via expedition proposals to transport providers, according to examples described herein.

In the below descriptions of the flow charts of FIGS. 3 through 5, reference may be made to reference characters representing like features described with respect to FIGS. 1 and 2. Furthermore, the processes described with respect to FIGS. 3 through 5 may be performed by an example network computing system 100, 290 as shown and described in connection with FIGS. 1 and 2. Still further, the blocks representing method steps in FIGS. 3 through 5 may be performed by the network computing device 100, 290 in any ordered combination, in any sequence, and in various applications, simultaneously. Accordingly, the logical flows between the blocks shown in FIGS. 3 through 5 are presented by way of example, and the order of processes is not limited to the order shown in FIGS. 3 through 5.

Figure 3:
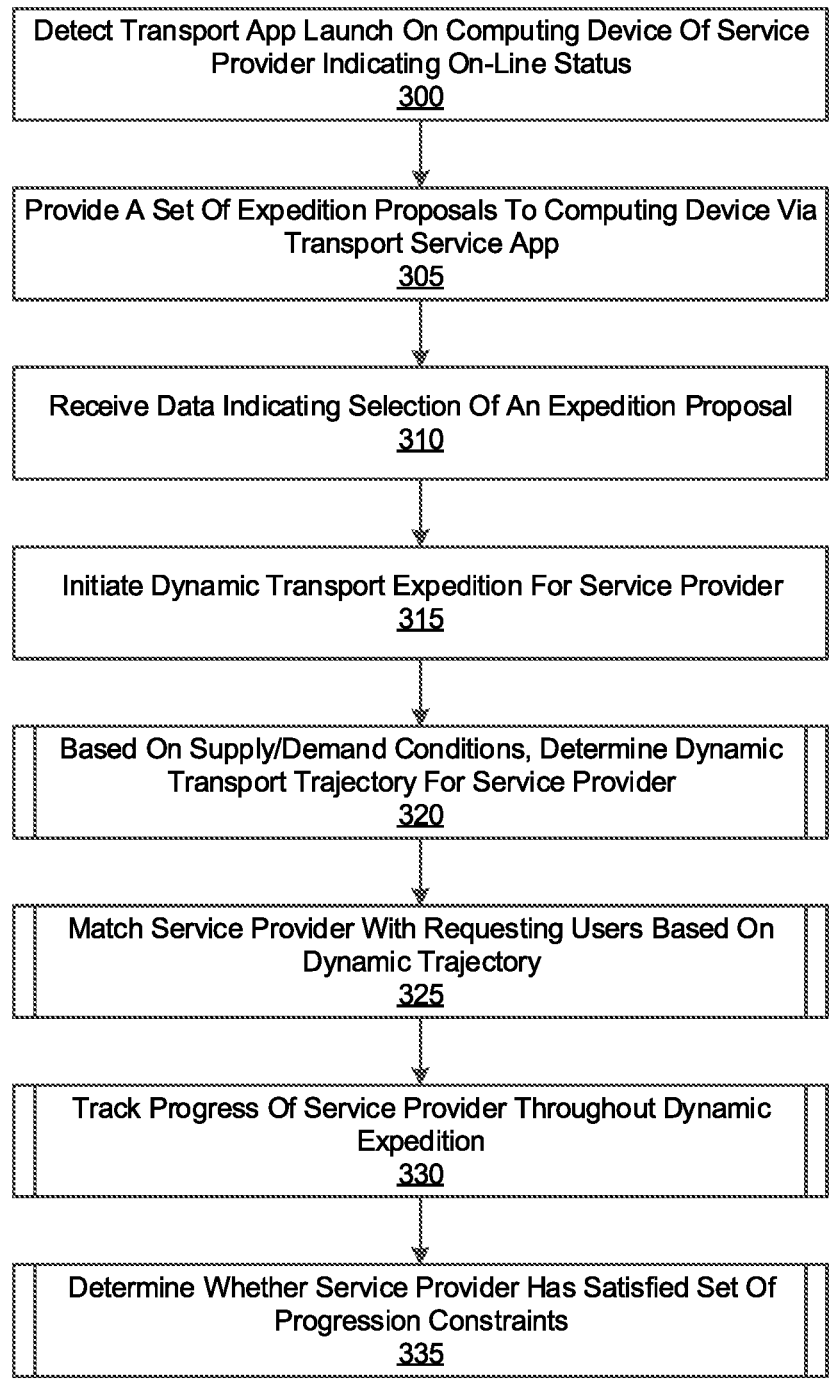
FIG. 3 is a flow chart describing an example method of coordinating a dynamic expedition for a transport provider, according to examples described herein.

FIG. 3 is a flow chart describing an example method of coordinating a dynamic expedition for a service provider, according to examples described herein. According to examples described herein, the network computing system 100 can detect the launch of a service application 191 on a service provider's computing device 190 (300). For example, the application launch can automatically connect the service provider's computing device 190 to the network computing system 100 over one or more networks 180.

In various examples, the network computing system 100 can provide a set of expedition proposals to the computing device 190 of the service provider 193 via the service application 191 (305). The network computing system 100 may then receive data indicating a selection of an expedition proposal (310). Based on the selected expedition proposal, the network computing system 100 can initiate a dynamic transport expedition for the service provider 193 in accordance with examples described herein (315).

Specifically, the network computing system 100 can determine a dynamic transport trajectory for the service provider 193 based on supply/demand conditions of service areas in the transport service region (320). For example, the dynamic trajectory may be centered on the service provider 193 and can be based on the supply/demand scores as determined by the service area scoring engine 160, as described herein. In some aspects, the transport trajectory can comprise a vector having a magnitude and direction pointing generally towards undersupplied service area(s) (e.g., as determined by the supply/demand scores for proximate service areas to the service provider 193). Over the course of the dynamic expedition, the network computing system 100 can match the service provider 193 with requesting users 197 and/or transport requests based on the dynamic transport trajectory (e.g., in the direction of the vector) (325).

The network computing system 100 can track the progress of the service provider 193 throughout the dynamic transport expedition (330). For example, the network computing system 100 can ascertain the performance of the service provider 193 based on a set of expedition progression constraints, as described herein. The network computing system 100 can determine whether the service provider 193 has satisfied the set progression constraints, and/or whether a set of performance thresholds based on the set of progression constraints have been satisfied (335). In certain implementations, the network computing system 100 can dynamically track logical demerits for any contraventions of the expedition progress constraints, or tally a total number of demerits at an expiration time of the dynamic expedition to determine the compensation for the service provider 193.

FIG. 4 is a flow chart describing an example method of progress monitoring for a service provider committed to a dynamic expedition, according to examples described herein. In certain implementations, the network computing system 100 can monitor and score service areas of the transport service region based on transport supply versus transport demand for on-demand transport services (400). In some aspects, the network computing system 100 can score each service area based on real-time supply/demand conditions (402). Additionally or alternatively, the network computing system 100 can score each service area based on forecasted supply/demand conditions (e.g., due to a scheduled mass egress event or historical data) (404).

In various implementations, the network computing system 100 can generate a set of expedition proposals for each service provider 193 in the transport service region (405). In some examples, the network computing system 100 can individually tailor the expedition proposals based on a set of parameters individual to the service provider 193 (e.g., the service provider's location, preferences, driving characteristics, etc.) (407). Additionally or alternatively, the network computing system 100 can create a set of general expedition proposals that any service provider 193 can accept (409). For example, general expedition proposals may be displayed on every service provider device 190 within a certain service area, or throughout the transport service region.

According to certain examples, the network computing system 100 can detect a service provider selection of an expedition proposal (410). As described herein, each expedition proposal can include a driving time period or schedule, a start location (e.g., the service provider's current location or an alternative street location), an end location (e.g., the service provider's home location), and/or a general route or servicing area. Based on the selected expedition proposal, the network computing system 100 can coordinate the dynamic expedition for the service provider 193 (415), as described above with respect to FIG. 3. In various examples, the network computing system 100 can further track the progress of the service provider 193 based on a set of expedition progression constraints (420).

Specifically, the network computing system 100 can transmit route updates to the service provider's computing device 190 in accordance with the expedition (e.g., based on an optimal trajectory that is based on supply/demand scores of service areas of the transport service region) (425). The network computing system 100 can dynamically determine whether the service provider 193 follows the recommended route (430). If so (432), then the network computing system 100 can continue to transmit route updates to the service provider's computing device in accordance with the dynamic expedition (425). However, as an example, if the service provider 193 diverges from the recommended route (434), the network computing system 100 can transmit notifications for route compliance (435).

In various examples, after one or more notifications have been transmitted (e.g., attempting to persuade the service provider 193 to remain on the recommended route), the network computing system 100 can again determine whether the service provider 193 follows the recommended route (440). If not (444), then the network computing system 100 can terminate the dynamic expedition (465) and compensate the service provider 193 with the sum total of normal individual fares for completed transport tasks thus far (470), as described herein.

However, if the service provider 193 remains on the recommended route (442), the network computing system 100 can continue coordinating the dynamic expedition until an expiration time (445). If the service provider 193 completes the dynamic expedition and satisfies the set of progression constraints (e.g., completes the expedition above a minimum average speed accounting for traffic conditions), the network computing system 100 can determine whether the guaranteed imbursement corresponding to the completed dynamic expedition is greater than or less than the sum total of normal individual fares for all completed transport tasks of the dynamic expedition (450). If the guaranteed imbursement is greater than the sum total, then the network computing system 100 can compensate the service provider 193 with the guaranteed imbursement amount (455). However, if the guaranteed imbursement amount is less than the sum total, then the network computing system 100 can compensate the service provider 193 with the sum total to ensure that the service provider 193 earns the greater of the two amounts (460).

FIG. 5 is a flow chart describing an example method of monitoring supply/demand conditions for partitioned areas and executing optimal transport supply disbursement via expedition proposals to service providers, according to examples described herein. In accordance with various examples, the network computing system 100 can partition a transport service region into service areas for on-demand transport services (500). For example, the partitioned service areas can comprise polygonal shapes (e.g., hexagons) encompassing the same surface area or varying in size based on population within the polygon. In some aspects, the network computing system 100 can collect historical transport service data for each of the partitioned service areas (505). The historical data can comprise supply/demand data, timing information, and oversupply and undersupply trends within those service areas.

In various examples, the network computing system 100 can monitor real-time supply/demand conditions in each of the partitioned service areas (510). Based on the real-time and/or historical supply/demand conditions, the network computing system 100 can construct imbursement models for compensating service providers in connection with dynamic expedition proposals (515). For example, an imbursement model for a given service provider 193 may be constructed based on profile information of the service provider (e.g., indicating the service provider's promptness, efficiency, driving habits and traits, and the like). Additionally or alternatively, the network computing system 100 can construct supply distribution models to optimize transport supply across the partitioned service areas and throughout the transport service region (520). In addition, the network computing system 100 can store service provider profiles 147 indicating service provider information (525).

In certain implementations, the service provider information can comprise the driving traits and/or ratings of the service provider 193 (526). Additionally or alternatively, the service provider information can include route compliance information indicating whether the service provider 193 has a propensity towards complying or non-compliance (527). In some aspects, the service provider information can include a promptness or efficiency metric indicating a ratio of transport task acceptance to cancellation, a whether the service provider tends to lag when executing a transport task, and/or whether the service provider 193 tends to promptly respond and execute transport tasks (528).

In certain examples, the network computing system 100 can generate an interface feature enabling the service provider 193 to configure a custom expedition (530). For example, the interface feature can enable the service provider to establish a driving schedule (531), configure a start and/or end location (532), and/or configure which service types the service provider 193 is willing to perform (533). In certain implementations, the service provider 193 can input availability or unavailability for passenger transport, food delivery, package delivery, and the like.

The network computing system 100 can generate a set of expedition proposals, each being selectable by the service provider 193 (535). As described herein, each expedition proposal can be based on the characteristics of the individual service provider 193 (537). For example, the guaranteed imbursement amount coupled to each expedition proposal can be calculated based on the imbursement model constructed for that individual service provider 193. The imbursement model for each service provider 193 can generate increased guaranteed imbursement amounts for relatively efficient, prompt service providers 193 and decreased guaranteed imbursement amounts for relatively inefficient and lagging service providers.

Additionally or alternatively, the network computing system 100 can generate the expedition proposals based on the supply disbursement of service providers 193 across the partitioned service areas (539). For example, the network computing system 100 can determine that a concentration of service areas is currently or is forecasted to be severely undersupplied, resulting in assured demand in those service areas. The expedition proposals can be generated based on this real-time and/or forecasted demand with the intent to migrate service provider supply into these undersupplied service areas, and the guaranteed imbursement computations can reflect the assured demand and anticipated rapid turnover of completed transport tasks (e.g., generally increasing the guaranteed imbursement amounts).

According to various examples, the network computing system 100 can then provide the set of expedition proposals to the service provider device 190 to enable service provider selection (540). As described herein, each expedition proposal can include an individualized guaranteed imbursement amount based on the constructed imbursement models for each service provider 193 (542). For example, an expedition proposal may include the same time schedule and general route plan, but the guaranteed imbursement amounts may be different across a set of individual service providers based on their individual traits, ratings, reputations, efficiency profile, promptness, etc. Further, each expedition proposal can include a time schedule (e.g., a total drive time and any break times during the expedition) (544). As described herein, the selection of an expedition proposal can result in the network computing system 100 initiating and coordinating the dynamic expedition.

Hardware Diagram

Figure 6:
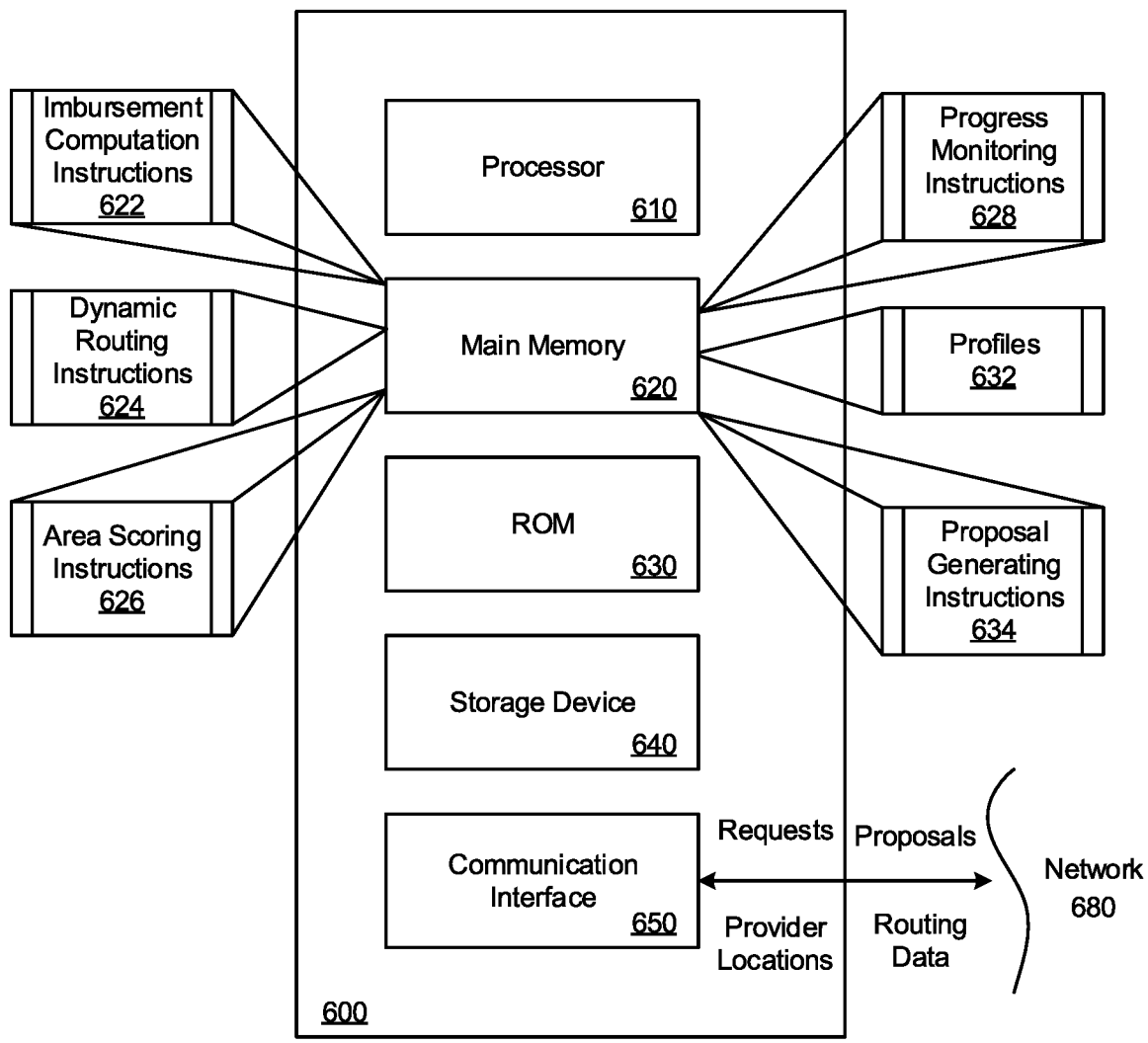
FIG. 6 is a block diagram that illustrates a computer system upon which examples described herein may be implemented.

FIG. 6 is a block diagram that illustrates a computer system upon which examples described herein may be implemented. A computer system 600 can be implemented on, for example, a server or combination of servers. For example, the computer system 600 may be implemented as part of a network service, such as described in FIGS. 1 through 5. In the context of FIG. 1, the computer system 100 may be implemented using a computer system 600 such as described by FIG. 6. The computer system 100 and may also be implemented using a combination of multiple computer systems as described in connection with FIG. 6.

In one implementation, the computer system 600 includes processing resources 610, a main memory 620, a read-only memory (ROM) 630, a storage device 640, and a communication interface 650. The computer system 600 includes at least one processor 610 for processing information stored in the main memory 620, such as provided by a random access memory (RAM) or other dynamic storage device, for storing information and instructions which are executable by the processor 610. The main memory 620 also may be used for storing temporary variables or other intermediate information during execution of instructions to be executed by the processor 610. The computer system 600 may also include the ROM 630 or other static storage device for storing static information and instructions for the processor 610. A storage device 640, such as a magnetic disk or optical disk, is provided for storing information and instructions.

The communication interface 650 enables the computer system 600 to communicate with one or more networks 680 (e.g., cellular network) through use of the network link (wireless or wired). Using the network link, the computer system 600 can communicate with one or more computing devices, one or more servers, one or more databases, and/or one or more self-driving vehicles. In accordance with examples, the computer system 600 receives requests from mobile computing devices of individual users. The executable instructions stored in the memory 630 can include imbursement computation instructions 622, dynamic routing instructions 624, service area scoring instructions 626, progress monitoring instructions 628, service provider profiles 632, and historical data 634, as described with examples herein.

As described herein, the processor 610 can execute area scoring instructions 626 to monitor real-time supply/demand conditions and/or forecast supply/demand conditions of each service area of the transport service region. Execution of the area scoring instructions 262 can cause the processor 610 to generate a supply/demand score for each service area to support expedition proposal construction and dynamic routing. The processor 610 can further execute proposal generating instructions 634 to generate respective sets of expedition proposals. For example, execution of the proposal generating instructions 634 can enable the processor to access service provider profiles 632 and the supply/demand scores to generate the expedition proposals described throughout the present disclosure. Still further, the proposal generating instructions 634 can further enable the processors 610 to generate customized expedition proposals based on a set of configurations inputted by the service provider.

The processor 610 can further execute the imbursement computation instructions 622 to calculate guaranteed imbursements for expedition proposals based on supply/demand scores (e.g., real-time and/or forecasted), as described herein. Still further, the processor 610 can execute the dynamic routing instructions 624 upon a service provider's selection of a particular expedition proposal. The dynamic routing instructions 624 can cause the processor 610 to receive transport requests from requesting users, match the requests to service providers on expeditions, and dynamically route the service providers to facilitate completion of each sequential transport task of a dynamic expedition.

Execution of the progress monitoring instructions 628 can cause the processor 610 to receive location data indicating the service provider location, and track the service provider in accordance with a set of progression constraints. For example, execution of the progress monitoring instructions 628 can cause the processor 610 to dynamically determine whether the service provider follows the recommended route, and issue demerits for any divergences or other anomalous activity (e.g., unscheduled breaks, traffic law violations, abnormally slow driving, etc.).

By way of example, the instructions and data stored in the memory 620 can be executed by the processor 610 to implement an example computer system 100 of FIG. 1. In performing the operations, the processor 610 can receive user and service provider locations, and configure expedition proposals and provide dynamic routing data to service providers to facilitate the dynamic expeditions and the servicing of the transport requests. The processor 610 is configured with software and/or other logic to perform one or more processes, steps and other functions described with implementations, such as described by FIGS. 1 to 5, and elsewhere in the present application.

Examples described herein are related to the use of the computer system 600 for implementing the techniques described herein. According to one example, those techniques are performed by the computer system 600 in response to the processor 610 executing one or more sequences of one or more instructions contained in the main memory 620. Such instructions may be read into the main memory 620 from another machine-readable medium, such as the storage device 640. Execution of the sequences of instructions contained in the main memory 620 causes the processor 610 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. A network computing system for managing a transport service, comprising:
   one or more processors; and
   a memory storing instructions that, when executed by the one or more processors, cause the network computing system to:
      provide, to a computing device of a service provider over one or more networks, a set of expedition proposals that are each selectable by the service provider on a user interface of the computing device, each expedition proposal in the set of expedition proposals being associated with a sequence of tasks to be performed for a given amount of time;
      based on detecting a selection by the service provider of a selected expedition proposal from the set of expedition proposals presented on the user interface, initiate a corresponding expedition for the service provider by:
         matching the service provider with a sequence of tasks associated with the selected expedition proposal; and
         transmitting, to the computing device of the service provider, route data causing the user interface on the computing device to display route information for sequential locations that correspond to the sequence of tasks associated with the selected expedition proposal to enable the service provider to perform the sequence of tasks associated with the selected expedition proposal.

2. The network computing system of claim 1, wherein the executed instructions further cause the network computing system to:
monitor progress of the service provider against a set of expedition progression constraints for the corresponding expedition; and
at expiration of the given amount of time, determine whether the service provider has satisfied the set of expedition progression constraints for the corresponding expedition.

3. The network computing system of claim 2, wherein the route information comprises real-time route recommendations from the network computing system, and wherein executed instructions cause the network computing system to monitor the progress of the service provider against the set of expedition progression constraints by (i) receiving real-time location data from a positioning system of the computing device of the service provider, and (ii) based on the real-time location data, determining whether the service provider follows the real-time route recommendations.

4. The network computing system of claim 3, wherein the set of expedition progression constraints comprises a temporal constraint, and wherein the executed instructions cause the network computing system to further determine whether the service provider follows the real-time route recommendations based on the temporal constraint and current traffic conditions along the real-time route recommendations.

5. The network computing system of claim 4, wherein the temporal constraint comprises a minimum average speed of the service provider along the real-time route recommendations given the current traffic conditions.

6. The network computing system of claim 1, wherein the executed instructions cause the network computing system to match the service provider with the sequence of tasks based on a determined driving trajectory of the service provider.

7. The network computing system of claim 6, wherein a transport service region in which the service provider operates is partitioned into a plurality of service areas for the transport service, and wherein the executed instructions cause the network computing system to determine the determined driving trajectory for the service provider by (i) scoring each service area of the plurality of service areas based on real-time service provider supply versus real-time transport demand from requesting users of the transport service within the service area, and (ii) determining a direction from a current location of the service provider based on scoring each service area of the plurality of service areas.

8. The network computing system of claim 7, wherein the executed instructions further cause the network computing system to:
based on historical data collected for the transport service, forecast a service provider supply and a transport demand from requesting users of the transport service for each service area of the plurality of service areas representing the transport service region;
wherein the executed instructions cause the network computing system to further score each service area of the plurality of service areas based on the forecasted service provider supply and the forecasted transport demand within the service area.

9. The network computing system of claim 1, wherein each expedition proposal of the set of expedition proposals comprises a guaranteed imbursement for the service provider for completing the expedition corresponding to the expedition proposal.

10. The network computing system of claim 1, wherein the sequence of tasks comprises at least one of passenger transport, food delivery, or package delivery.

11. A non-transitory computer readable medium storing instructions that, when executed by one or more processors of a network computing system, cause the network computing system to:
provide, to a computing device of a service provider over one or more networks, a set of expedition proposals that are each selectable by the service provider on a user interface of the computing device, each expedition proposal in the set of expedition proposals being associated with a configured sequence of tasks to be performed for a given amount of time;
based on detecting a selection by the service provider of a selected expedition proposal from the set of expedition proposals presented on the user interface, initiate a corresponding expedition for the service provider by:
matching the service provider with a sequence of tasks associated with the selected expedition proposal; and
transmitting, to the computing device of the service provider, route data causing the user interface on the computing device to display route information for sequential locations that correspond to the sequence of tasks associated with the selected expedition proposal to enable the service provider to perform the sequence of tasks associated with the selected expedition proposal.

12. The non-transitory computer readable medium of claim 11, wherein the executed instructions further cause the network computing system to:
monitor progress of the service provider against a set of expedition progression constraints for the corresponding expedition; and
at expiration of the given amount of time, determine whether the service provider has satisfied the set of expedition progression constraints for the corresponding expedition.

13. The non-transitory computer readable medium of claim 12, wherein the route information comprises real-time route recommendations from the network computing system, and wherein executed instructions cause the network computing system to monitor the progress of the service provider against the set of expedition progression constraints by (i) receiving real-time location data from a positioning system of the computing device of the service provider, and (ii) based on the real-time location data, determining whether the service provider follows the real-time route recommendations.

14. The non-transitory computer readable medium of claim 13, wherein the set of expedition progression constraints comprises a temporal constraint, and wherein the executed instructions cause the network computing system to further determine whether the service provider follows the real-time route recommendations based on the temporal constraint and current traffic conditions along the real-time route recommendations.

15. The non-transitory computer readable medium of claim 14, wherein the temporal constraint comprises a minimum average speed of the service provider along the real-time route recommendations given the current traffic conditions.

16. The non-transitory computer readable medium of claim 11, wherein the executed instructions cause the network computing system to match the service provider with the sequence of tasks based on a determined driving trajectory of the service provider.

17. The non-transitory computer readable medium of claim 16, wherein a transport service region in which the service provider operates is partitioned into a plurality of service areas for the transport service, and wherein the executed instructions cause the network computing system to determine the determined driving trajectory for the service provider by (i) scoring each service area of the plurality of service areas based on real-time service provider supply versus real-time transport demand from requesting users of the transport service within the service area, and (ii) determining a direction from a current location of the service provider based on scoring each service area of the plurality of service areas.

18. The non-transitory computer readable medium of claim 17, wherein the executed instructions further cause the network computing system to:
    based on historical data collected for the transport service, forecast a service provider supply and a transport demand from requesting users of the transport service for each service area of the plurality of service areas representing the transport service region;
    wherein the executed instructions cause the network computing system to further score each service area of the plurality of service areas based on the forecasted service provider supply and the forecasted transport demand within the service area.

19. The non-transitory computer readable medium of claim 11, wherein each expedition proposal of the set of expedition proposals comprises a guaranteed imbursement for the service provider for completing the expedition corresponding to the expedition proposal.

20. A computer-implemented method of managing a transport service, the method being performed by one or more processors and comprising:
    providing, to a computing device of a service provider over one or more networks, a set of expedition proposals that are each selectable by the service provider on a user interface of the computing device, each expedition proposal in the set of expedition proposals being associated with a sequence of tasks to be performed for a given amount of time;
    based on detecting a selection by the service provider of a selected expedition proposal from the set of expedition proposals presented on the user interface, initiating a corresponding expedition for the service provider by:
        matching the service provider with a sequence of tasks associated with the selected expedition proposal; and
        transmitting, to the computing device of the service provider, route data causing the user interface on the computing device to display route information for sequential locations that correspond to the sequence of tasks associated with the selected expedition proposal to enable the service provider to perform the sequence of tasks associated with the selected expedition proposal.

* * * * *